UNITED STATES PATENT OFFICE.

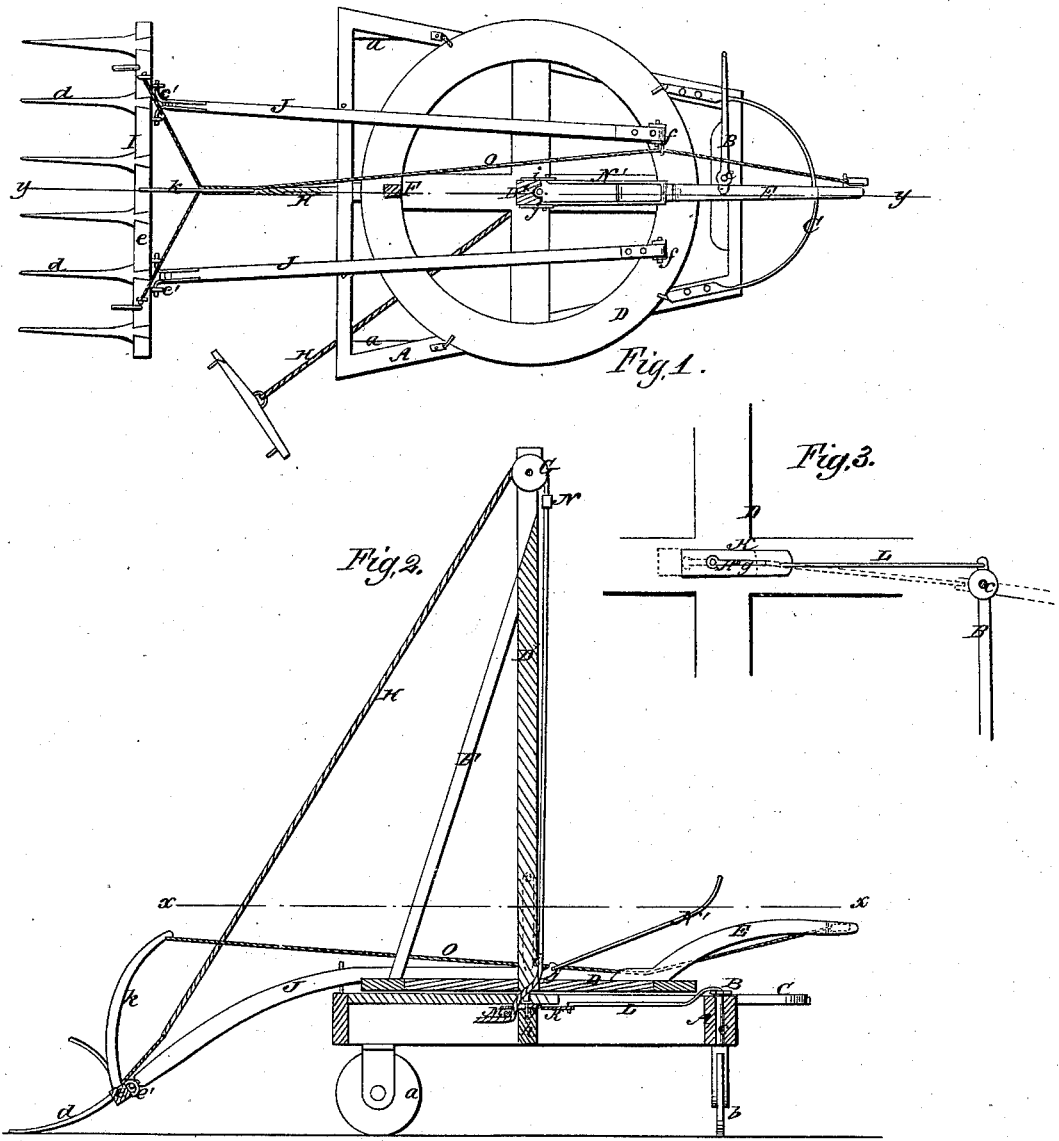

S. R. HIGGINS, OF PARMA, MICHIGAN.

IMPROVEMENT IN HAY-LOADERS.

Specification forming part of Letters Patent No. 54,723, dated May 15, 1866.

*To all whom it may concern:*

Be it known that I, S. R. HIGGINS, of Parma, in the county of Jackson and State of Michigan, have invented a new and Improved Hay and Grain Loading Device; and I do hereby declare that the following is a full, clear, and exact description thereof, which will enable those skilled in the art to make and use the same, reference being had to the accompanying drawings, forming part of this specification, in which—

Figure 1 is a horizontal section of my invention, taken in the line $x\ x$, Fig. 2; Fig. 2, a side sectional view of the same, taken in the line $y\ y$, Fig. 1; Fig. 3, an inverted plan of a portion of the same.

Similar letters of reference indicate corresponding parts.

This invention relates to a new and improved machine for loading wagons with hay or grain; and it consists in a novel construction of a rake and the application of the same to a mounted frame, in connection with a hoisting and lowering tackle, tripping device, clutch, and turn-table, as hereinafter fully shown and described, whereby hay or grain may be taken up either from cocks or windrows, or from the swath, and deposited upon the wagon or cart with the greatest facility.

A represents a mounted frame, one end being supported by two wheels, $a\ a$, and the opposite end supported by a caster-wheel, $b$, the arbor $c$ of which passes up through frame A, and has a lever, B, on its upper end for the convenience of turning said caster-wheel. A curved bar, C, is attached to the frame A, and has a notch in it to receive and hold lever B and retain the caster-wheel $b$ in line parallel with the wheels $a\ a$ when such position of the caster-wheel is required.

On the frame A there is placed a turn-table, D, having an upright, $D^\times$, attached centrally to it, and a handle, E, by which the table is turned. The upright $D^\times$ is secured in position by an inclined brace, F, and in the upper end of the upright there is a pulley, G, over which the hoisting-rope H of the rake passes.

The rake I is composed of a series of teeth, $d$, fitted to a head, $e$, the latter having a series of dovetail notches made in it to receive dovetail tenons on the inner ends of the teeth $d$, said tenons being bolted to the head. The rake-head is connected by joints $e'\ e'$ to the outer ends of arms J J, the inner ends of the latter being attached, by joints $f\ f$, to the turn-table D, to admit of the rake being raised and lowered. The arms J J are sufficiently long to admit of the rake I extending in front of the frame A or project beyond it at either side. The hoisting-rope H is attached to the rake-head $e$, and it passes over the pulley G in the top of upright $D^\times$, and down through the turn-table and through an oblong slot, $g$, in a sliding plate, K, which is connected, by a rod, L, with the rear end of lever B, the rope H passing under a friction-roller, M, at the under side of frame A, at one side of a cross-bar, $h$, thereof. The slot $g$ in the plate K is narrow the greater portion of its length, and is enlarged at one end, as shown clearly in Fig. 3.

The hoisting-rope H has a short cross-bar, N, attached to it, and in the lower part of the upright $D^\times$, at one side of it, there is a notch, $i$, to receive it when the rope H is pulled down sufficiently far. At the opposite sides of the uprights $D^\times$ there are bars $j$, secured by pivots at their upper ends, the lower ends of said bars extending down below the notch $i$ at each end of it. These bars $j\ j$ are connected at their lower ends to a handle, $N^\times$.

The rake-head $e$ has an arm, $k$, attached to it, to the upper end of which a rope or cord, O, is connected.

The operation is as follows: The device is connected to a wagon or cart at one side of the same, and the rake I lowered so that it will work upon the ground and rake up the hay from a windrow as the wagon is drawn along, the caster-wheel $b$ being adjusted in line with the wheels $a\ a$. When the rake is thus at work the hoisting-rope H is clutched by the plate K, which, when the lever B is turned to bring the caster-wheel $b$ in line with the wheels $a\ a$, is moved so as to cause the rope H to pass into the narrow part of slot $g$. The horse is attached to the lower end of the hoisting-rope H, and this clutching of said rope prevents the rake from being casually raised when at work. When the rake has gathered up a sufficient quantity of hay or grain the wagon is stopped, the operator, through the medium of lever B, turns the caster-wheel $b$ around, so that it will be at right angles with the wheels $a\ a$ to form an anchor for the device, and in so doing the plate K is moved and the rope H passed out from the narrow part of the slot $g$ into the enlarged part, thereby leaving the rope H free to move. The horse, which is attached to rope H, is then started, and the rake, with its load, elevated, the rope or cord O keeping the rake in proper position to retain its load in consequence of being held by any suitable means within convenient reach of the operator. By the time the rake is sufficiently elevated the bar N of rope H will pass into the notch $i$ in the lower part of the upright D$^\times$, and the horse being stopped the table is turned until the rake is brought over the wagon, when the rope or cord O is liberated and the rake will tilt down, so that its load will be discharged upon the wagon. The rake is then turned around to its original position, the bar N drawn out from the notch $i$ by pulling handle N$^\times$, and the horse backed, which allows the rake to descend gently to its original position.

The whole arrangement is extremely simple and efficient. The rake, it will be seen, performs the function of a rake and fork, and the device may be employed for loading from cocks or from windrows.

Having thus described my invention, I claim as new and desire to secure by Letters Patent—

1. The rake I, connected by joints to arms J J, which are secured by joints to a turntable, D, on a mounted frame, and arranged with a hoisting-tackle and upright on the turntable, to operate in the manner substantially as and for the purpose set forth.

2. The sliding plate K, provided with an oblong slot, $g$, through which the hoisting-rope H passes, and connected with the lever B of the arbor of the caster-pulley $b$, to serve as a clutch for the hoisting-rope, substantially as described.

S. R. HIGGINS.

Witnesses:
T. M. SANFORD,
R. LANDON.